(12) United States Patent
Pathakota et al.

(10) Patent No.: US 9,369,397 B1
(45) Date of Patent: Jun. 14, 2016

(54) APPARATUS TO ACHIEVE QUALITY OF SERVICE (QOS) WITHOUT REQUIRING FABRIC SPEEDUP

(71) Applicant: Juniper Networks, Inc., Sunnyvale, CA (US)

(72) Inventors: Ravi Pathakota, Bangalore (IN); Sarin Thomas, Sunnyvale, CA (US); Sudipta Kundu, Hooghly (IN); Srihari R. Vegesna, Bangalore (IN); Firdaus Mahiar Irani, Bengaluru (IN); Kalpataru Maji, Bangalore (IN); Naveen K. Jain, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 135 days.

(21) Appl. No.: 14/332,564

(22) Filed: Jul. 16, 2014

(51) Int. Cl.
*H04L 12/28* (2006.01)
*H04L 12/873* (2013.01)
*H04L 12/805* (2013.01)

(52) U.S. Cl.
CPC .............. *H04L 47/527* (2013.01); *H04L 47/36* (2013.01); *H04L 47/365* (2013.01)

(58) Field of Classification Search
None
See application file for complete search history.

(56) References Cited

U.S. PATENT DOCUMENTS

| | | | | |
|---|---|---|---|---|
| 6,351,466 B1* | 2/2002 | Prabhakar | ............... | H04L 12/56 370/413 |
| 6,757,246 B2* | 6/2004 | Alasti | ................... | H04L 49/254 370/229 |
| 7,042,883 B2* | 5/2006 | Fan | ..................... | H04L 12/5602 370/230 |
| 7,738,473 B2* | 6/2010 | Nielsen | .................. | H04L 47/15 370/413 |
| 2004/0165598 A1* | 8/2004 | Shrimali | ............... | H04L 49/254 370/395.42 |

OTHER PUBLICATIONS

Chrysos et al, Scheduling in Non-Blocking Buffered Three-Stage Switching Fabrics, IEEE, 13 pages, 2006.*
Wikipedia, "Switched fabric", http://en.wikipedia.org/wiki/Switched_fabric, Dec. 2, 2013, 2 pages.
Ofer lny, "Calculating Speedup in Switch Fabric Designs", http://www.eetimes.com/document.asp?doc_id=1277913, Dec. 4, 2002, 5 pages.

* cited by examiner

*Primary Examiner* — Frank Duong
(74) *Attorney, Agent, or Firm* — Harrity & Harrity, LLP

(57) ABSTRACT

A device may store a credit value for each of multiple output components. The device may receive packets from a network device via an input component. The device may cause the input component to queue the packets. The device may selectively dequeue a packet from the input component, to be sent to an output component, based on whether the credit value for the output component satisfies a credit threshold. The device may send the packet to the output component based on a destination of the packet when the packet is dequeued from the input component. The device may determine a size of the packet after the packet is dequeued. The device may update the credit value for the output component based on the size of the packet. The device may output the packet to another network device via the output component.

20 Claims, 7 Drawing Sheets

| Action | 400G Output Component | | 100G Output Component | |
|---|---|---|---|---|
| | Credit Count | Request Count | Credit Count | Request Count |
| Set credit count and request count | 96 | 1 | 0 | 1 |
| First dequeue to 400G Output Component | 96 | 0 | 0 | 1 |
| First dequeue to 100G Output Component | 96 | 0 | 0 | 0 |
| Obtain dequeue response for 400G Output Component (packet size = 32 bytes) | 64 | 1 | 0 | 0 |
| Obtain dequeue response for 100G Output Component (packet size = 32 bytes) | 64 | 1 | -32 | 1 |
| Second dequeue to 400G Output Component | 64 | 0 | -32 | 1 |
| Obtain dequeue response for 400G Output Component (packet size = 32 bytes) | 32 | 1 | -32 | 1 |
| Third dequeue of 400G Output Component | 32 | 0 | -32 | 1 |
| Obtain dequeue response for 400G Output Component (packet size = 32 bytes) | 0 | 1 | -32 | 1 |
| Fourth dequeue to 400G Output Component | 0 | 0 | -32 | 1 |
| Obtain dequeue response for 400G Output Component (packet size = 32 bytes) | -32 | 1 | -32 | 1 |
| Replenish credit count | 96 | 1 | 0 | 1 |

FIG. 5

APPARATUS TO ACHIEVE QUALITY OF SERVICE (QOS) WITHOUT REQUIRING FABRIC SPEEDUP

BACKGROUND

A virtual output queue (VOQ) system may include a fabric scheduler and an output scheduler that work together to output packets from a network device. The fabric scheduler may schedule packets from multiple input components be sent to multiple output components. The output scheduler (e.g., a port scheduler) may schedule packets to output according to quality of service (QoS) properties.

SUMMARY

According to some possible implementations, a device may store a credit value for each of multiple output components. The device may receive packets from a network device via an input component. The device may cause the input component to queue the packets. The device may selectively dequeue a packet from the input component, to be sent to an output component, based on whether the credit value for the output component satisfies a credit threshold. The device may send the packet to the output component based on a destination of the packet when the packet is dequeued from the input component. The device may determine a size of the packet after the packet is dequeued. The device may update the credit value for the output component based on the size of the packet. The device may output the packet to another network device via the output component.

According to some possible implementations, a computer-readable medium may store instructions, that when executed by a processor, may cause the processor to store a credit value for each of a plurality of output components. The credit value may be based on weights assigned to the plurality of output components. The instructions may cause the processor to receive packets from a first device via an input component. The instructions may cause the processor to cause the input component to store the packets in one or more queues. The instructions may cause the processor to selectively dequeue a packet from the input component, to be sent to an output component, based on whether the credit value for the output component satisfies a credit threshold. The instructions may cause the processor to send the packet to the output component based on a destination of the packet when the packet is dequeued. The instructions may cause the processor to determine a size of the packet. The instructions may cause the processor to update the credit value for the output component based on the size of the packet. The instructions may cause the processor to output the packet to a second device via the output component.

According to some possible implementations, a method may include storing, by a device, a credit value for each of a plurality of output components. The credit value may be based on weights assigned to the plurality of output components. The method may include receiving, by the device, packets from a first device, via a plurality of input components, to be output to a second device. The method may include causing, by the device, the plurality of input components to store the packets in one or more queues included in the plurality of input components. The method may include selectively dequeuing, by the device, a packet from a particular input component, to be sent to an output component, based on whether the credit value for the output component satisfies a credit threshold. The method may include sending, by the device, the packet to the output component to be output from the device when the packet is dequeued. The method may include determining, by the device, a size of the packet after the packet has been dequeued. The method may include updating, by the device, the credit value for the particular output component based on the size of the packet. The method may include outputting, by the device, the packet to the second device via the output component.

BRIEF DESCRIPTION OF THE DRAWINGS

FIG. 5 is a diagram of an example implementation relating to the example process shown in FIGS. 4A-4C.

DETAILED DESCRIPTION

The following detailed description of example implementations refers to the accompanying drawings. The same reference numbers in different drawings may identify the same or similar elements.

For a port scheduler to properly output packets according to QoS properties, the port scheduler may have to be the dominate scheduler. In other words, queues facing the port scheduler may need to be filled up by the fabric scheduler to get the proper QoS behavior. For example, the proper QoS behavior may include a bandwidth distribution according to weights, a bandwidth distribution according to priorities, and/or rate.

Fabric speedup may be used to ensure the port scheduler is a dominant scheduler. Fabric speedup is a factor by which a switch fabric runs compared to an input/output line rate. This means that a total bandwidth available through the switch fabric may be more than an output port's bandwidth, thus ensuring the port scheduler is the dominate scheduler. However, fabric failures where fabric connectivity is lost on some of the fabric planes may cause the fabric speedup to be lost. Moreover, a high output port density may cause oversubscription (e.g., the output port bandwidth may be larger than the fabric bandwidth).

Such fabric failure or oversubscription may cause the fabric scheduler to become the dominant scheduler. Thus, all the packets that come over the switch fabric may be scheduled by the port scheduler on the output ports based on the traffic pattern and there may be no buildup of packets in the queues facing the port scheduler. When this happens, the observed scheduling behavior on the network ports may be per the scheduling policies configured in the fabric scheduler. If the fabric scheduler is not configured to maintain QoS properties, the QoS properties may be lost when the fabric scheduler becomes the dominant scheduler. Accordingly, implementations described herein may configure the fabric scheduler to maintain QoS properties. Systems and methods, as described herein, may achieve QoS without requiring fabric speedup and may maintain QoS properties when the fabric scheduler becomes the dominant scheduler. Additionally, or alternatively, fabric scheduling may be used to achieve QoS based on weights assigned to output components and sizes of packets dequeued to the output components.

Figure 1:
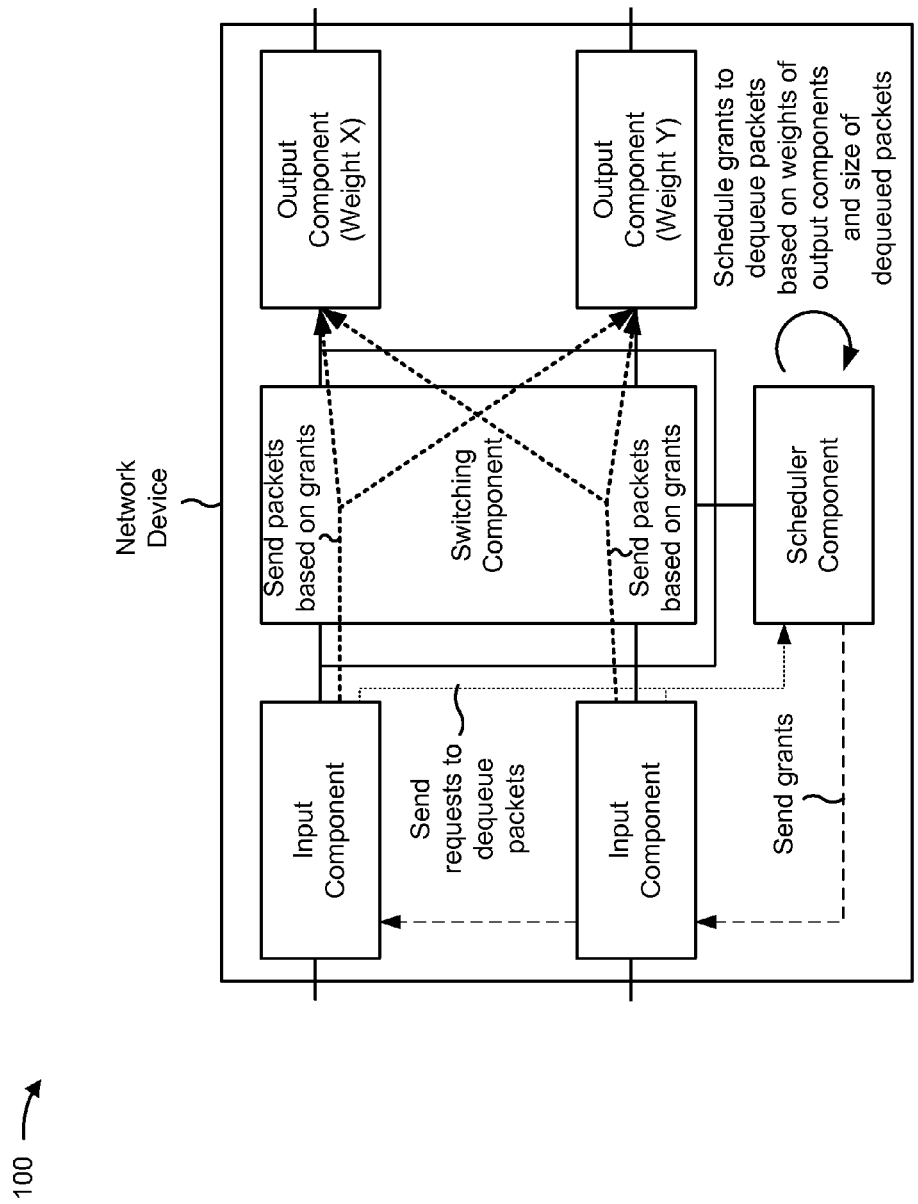
FIG. 1 is a diagram of an overview of an example implementation described herein.

FIG. 1 is a diagram of an overview of an example implementation 100 described herein. As shown in FIG. 1, a network device (e.g., a router) may include input components, output components, a switching component, and a scheduler component. The input components may receive packets from a network and store the packets in input queues (e.g., virtual output queues). The input components may send requests to the scheduler component associated with the output components to schedule dequeues of packets, from the input queues, to be sent to the output components (e.g., output queues included in the output components). The scheduler component may schedule the dequeuing of the packets from the input queues, based on the requests, by issuing grants to the input components that permit the input components to send the packets to the output components. The input components may then send the packets from the input queues to the output components via the switching component and based on the grants. The output components may output the packets to the network.

Assume each output component is assigned a respective weight (e.g., based on an output rate of the output component). Further, assume each output component has a credit count, based on the weight, which indicates an amount of data that may be dequeued from the input queues to the output component.

The scheduler component may issue a grant for dequeuing a packet and sending the packet to the output component as long as the credit count for the output component satisfies a credit threshold. The credit count for the output component may be reduced after a dequeue of a packet by the size of the dequeued packet. The size of the packet may differ among packets. In some implementations, the credit count may also be adjusted based on a rewrite of the packet by network device 210 (e.g., an egress rewrite). Once a credit count for an output component fails to satisfy the credit threshold, the scheduler component may prevent packets from being dequeued to the output component. This process of dequeuing packets may be repeated until no output component has a credit count that satisfies the credit threshold. At such a time, the scheduler component may replenish the credit counts for the output components to the initial credit counts, and repeat scheduling dequeuing packets to the output components (e.g., by issuing grants to the input components).

In this way, the scheduler component may cause data to be dequeued from the input components to the output components at a rate consistent with the output rates of the output components, thereby achieving QoS (e.g., bandwidth distribution according to weights) using fabric scheduling. As will be discussed in more detail later, other QoS properties (e.g., bandwidth distribution according to priorities, rate, etc.) may also be achieved.

Figure 2:
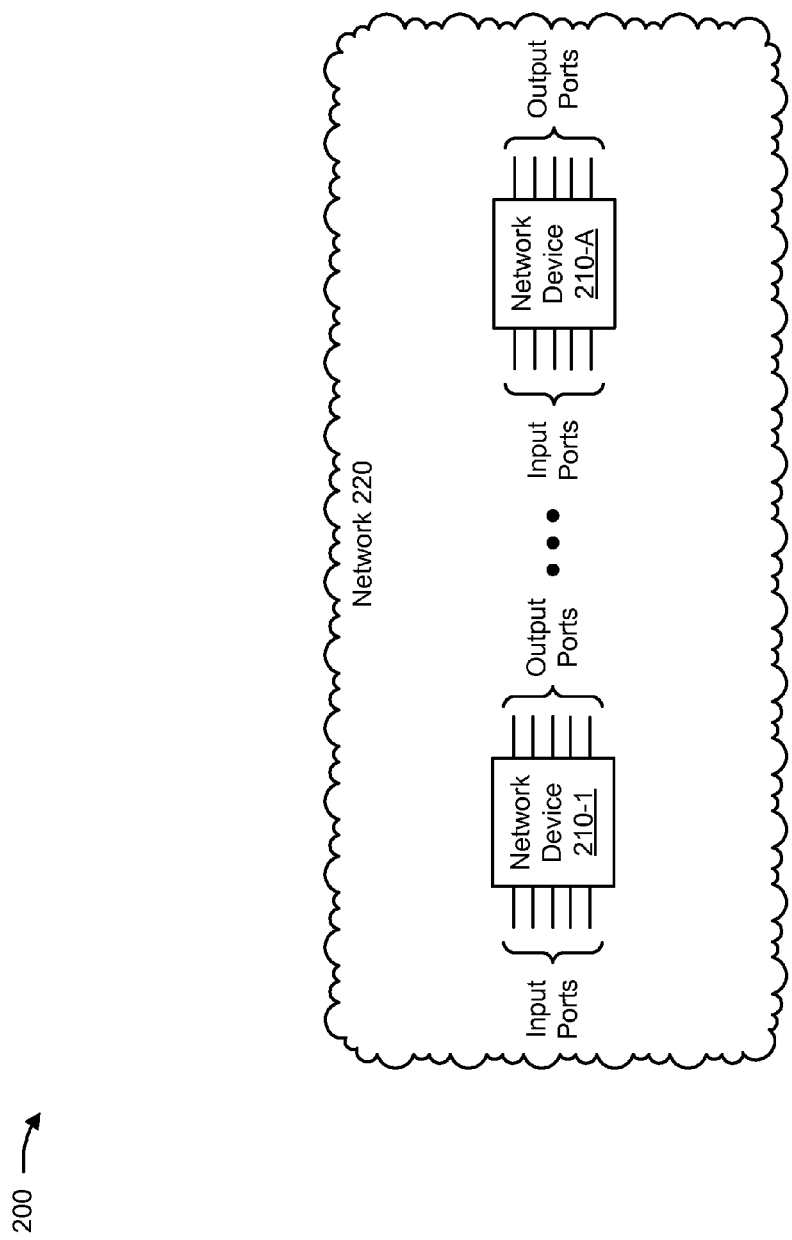
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-A (A≥1) (hereinafter referred to collectively as "network devices 210," and individually as "network device 210") and a network 220. Devices of environment 200 may interconnect via wired connections, wireless connections, or a combination of wired and wireless connections.

Network device 210 may include a device capable of receiving, transmitting, processing, and/or routing, etc. packets travelling via network 220. For example, network device 210 may include a switch, a router, a server, a gateway, a modem, a firewall, a hub, a bridge, a reverse proxy, a security device, an intrusion detection device, a load balancer, or another type of device included in network 220. In some implementations, network device 210 may include one or more input ports associated with receiving packets and one or more output ports associated with transmitting packets. In some implementations, network device 210 may be included in network 220.

Network 220 may include one or more wired and/or wireless networks that include one or more network devices 210. For example, network 220 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks. In some implementations, network 220 may include a layer 2 network (e.g., a data link layer network) and/or a layer 3 network (e.g., a network layer network).

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
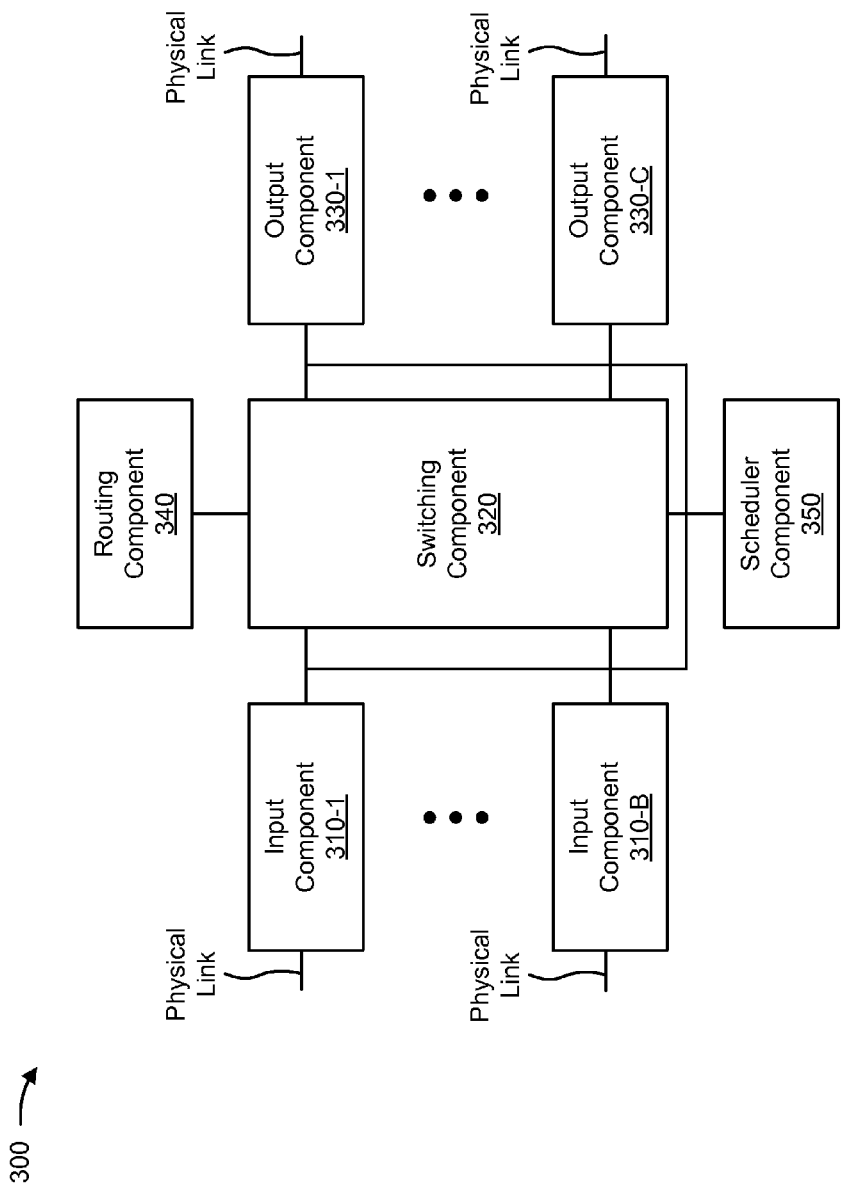
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include one or more input components 310-1 through 310-B (B≥1) (hereinafter referred to collectively as "input components 310," and individually as "input component 310"), a switching component 320, one or more output components 330-1 through 330-C (C≥1) (hereinafter referred to collectively as "output components 330," and individually as "output component 330"), a routing component 340, and/or a scheduler component 350.

Input component 310 may be points of attachment for physical links and may be points of entry for incoming packets. Input component 310 may process incoming packets, such as by performing data link layer encapsulation or decapsulation. In some implementations, input components 310 may send and/or receive packets.

In some implementations, input component 310 may include an input line card that includes one or more packet processing components (e.g., in the form of integrated circuits), input ports, processors, memories, and/or input queues. The input queues may temporarily store packets received via the input ports before the packets are sent to switching component 320. The packet processing components, the processors, and/or the memories may coordinate with scheduler component 350 to dequeue packets stored in the input queues and send the packets to switching component 320.

Switching component 320 may interconnect input components 310 with output components 330. Switching component 320 may be implemented using one or more of multiple, different techniques (e.g., a switch fabric). For example, switching component 320 may be implemented via busses, via crossbars, and/or with shared memories. The shared memories may act as temporary queues to store packets from input components 310 before the packets are eventually scheduled for delivery to output components 330. In some implementations, switching component 320 may enable input components 310, output components 330, and/or routing component 340 to communicate.

Output component 330 may store packets and may schedule packets for transmission on output physical links. Output component 330 may include scheduling algorithms that support priorities and guarantees. Output component 330 may support data link layer encapsulation or decapsulation, and/or a variety of higher-level protocols. In some implementations, output component 330 may send packets and/or receive packets.

In some implementations, output component 330 may include an output line card that includes one or more packet processing components, output ports, processors, memories, and/or output queues. One or more output queues may temporarily store packets received from switching component 320 before the packets are sent to the physical links to be output from device 300. In some implementations, the packet processing components, the processors, and/or the memories may dequeue the packets from the output queues according to priority and QoS properties.

Routing component 340 may include one or more processors, microprocessors, application-specific integrated circuits (ASICs), a field-programmable gate arrays (FPGAs), or similar types of processing components. In some implementations, routing component 320 may communicate with other devices, networks, and/or systems connected to device 300 to exchange information regarding network topology. Routing component 340 may create routing tables based on the network topology information, create forwarding tables based on the routing tables, and forward the forwarding tables to input components 310 and/or output components 330. Input components 310 and/or output components 330 may use the forwarding tables to perform route lookups for incoming packets.

Scheduler component 350 may schedule grants for dequeuing packets from input components 310 based on receiving requests from the input components 310. The grants may permit input components 310 to send packets, stored in input queues of input components 310, to output components 330. In some implementations, scheduler component 350 may include a fabric scheduler block that maintains particular QoS properties while scheduling packets to be sent from input components 310 to output components 330. In some implementations, scheduler component 350 may include an output scheduler (e.g., a port scheduler) that schedules packets, bytes, bits, etc. for output according to QoS properties. Scheduler component 350 may include a processor and a memory. The processor may include a central processing unit (CPU), a graphics processing unit (GPU), an accelerated processing unit (APU), a microprocessor, and/or any processing component (e.g., a FPGA, an ASIC, etc.) that interprets and/or executes instructions. The memory may include a random access memory (RAM), a read only memory (ROM), and/or another type of dynamic or static storage device (e.g., a flash memory, a magnetic memory, an optical memory, etc.) that stores information and/or instructions for use by the processor.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
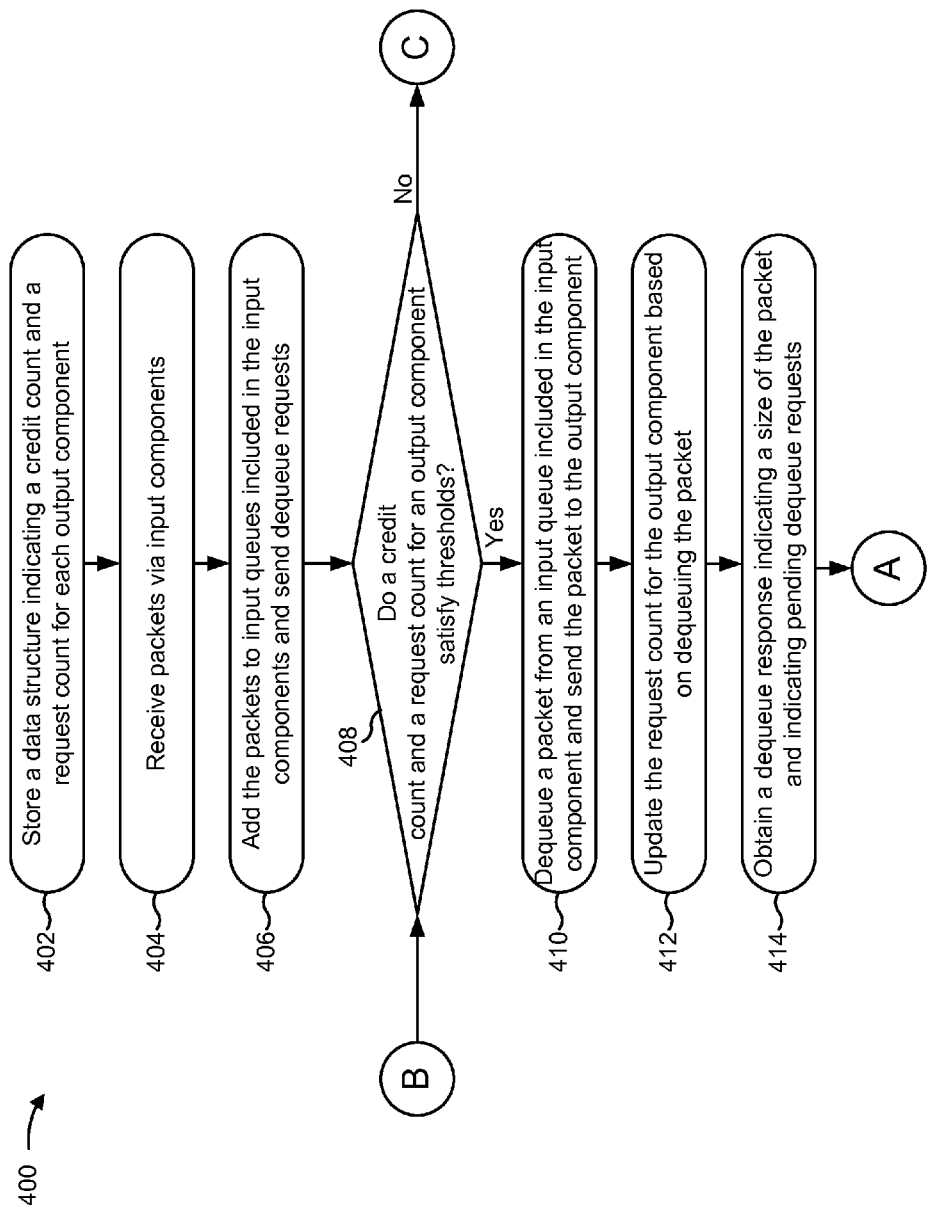
FIGS. 4A-4C are flow charts of an example process for dequeuing based on weights for output components to achieve QoS.
Figure 4B:
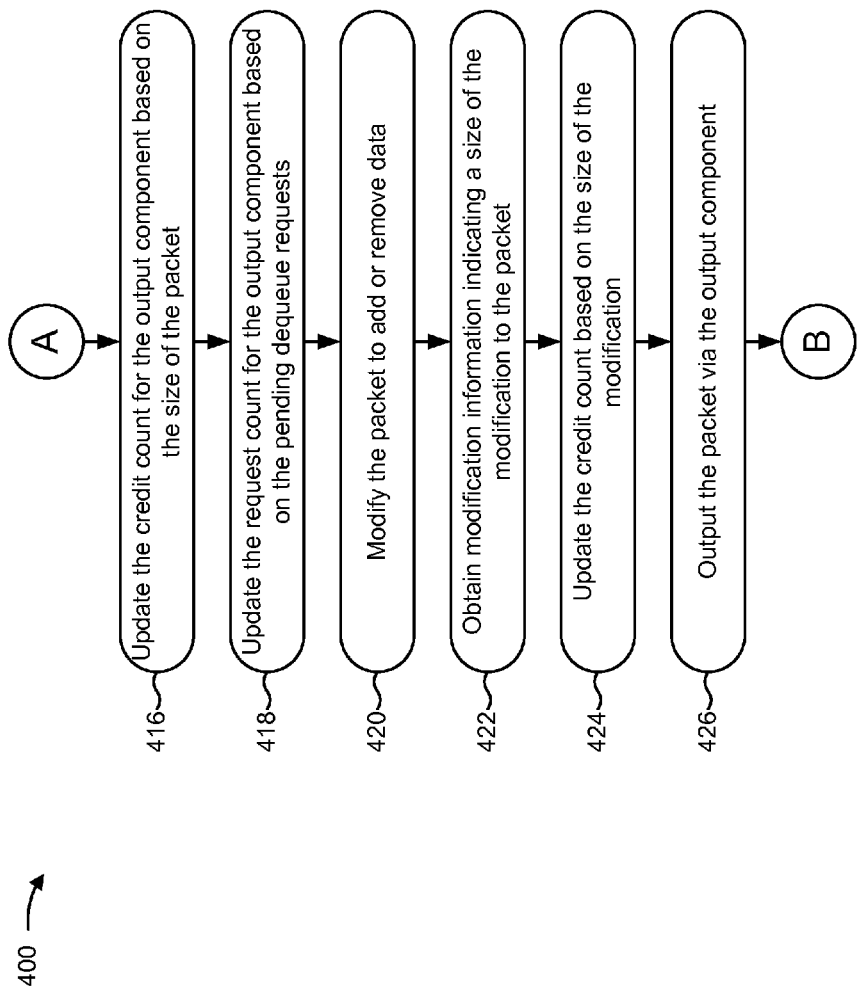
Figure 4C:
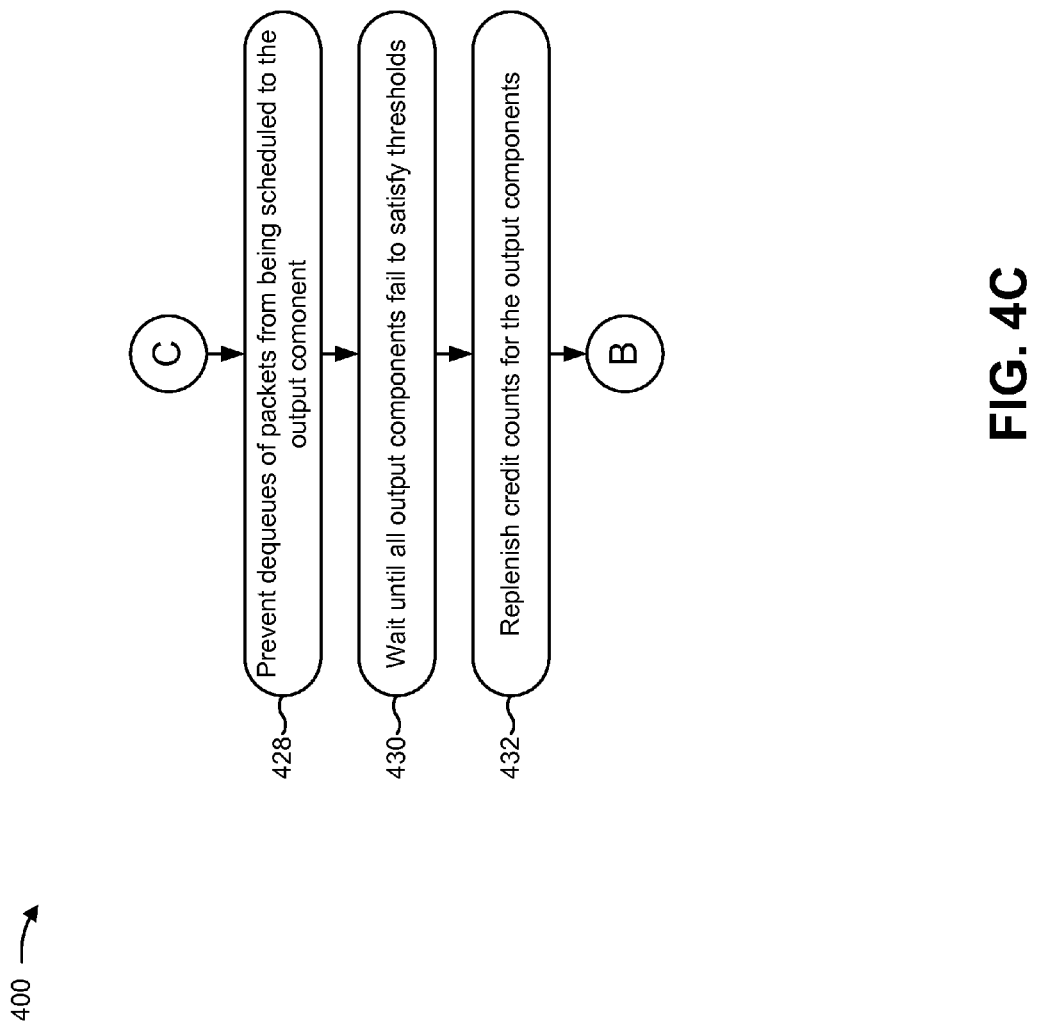

FIGS. 4A-4C are flow charts of an example process 400 for dequeuing based on weights for output components to achieve QoS. In some implementations, one or more process blocks of FIGS. 4A-4C may be performed by network device 210. In some implementations, one or more process blocks of FIGS. 4A-4C may be performed by one or more components included in network device 210, such as input component 310, switching component 320, output component 330, routing component 340, and/or scheduler component 350.

As shown in FIG. 4A, process 400 may include storing a data structure indicating a credit count and a request count for each output component 330 (block 402). For example, network device 210 (e.g., scheduler component 350 included in network device 210) may store the data structure indicating the credit count and the request count for each output component 330.

The credit count may be a value indicating an amount of data (e.g., a number of bits, bytes, etc.) that may be dequeued from input queues included in input components 310 to output component 330. An initial credit count may be set for each output component 330 based on a particular weight or ratio assigned to each output component 330. The particular weight or ratio may be assigned based on an output component type and/or a data rate associated output component 330 (e.g. 100 gigabit (G) Ethernet, 40 G Ethernet, 10 G Ethernet, etc.). For example, a 40 G Ethernet output component may be given a weight of 4 and a 10 G Ethernet output component may be given a weight of 1 based on the 40 G Ethernet output component having four times the rate of the 10 G Ethernet output component. Accordingly, the initial credit count for the 40 G Ethernet output component and the 10 G Ethernet output component may be set such that the 40 G Ethernet output component may have four times more data dequeued than the 10 G Ethernet output component.

The request count may be a value indicating whether there are any pending dequeue requests for output queues included in output component 330. In other words, the request count may indicate whether there are any packets to be dequeued from an input queue included in input component 310 to the output queue in output component 330. In some implementations, the request count may indicate a quantity of pending dequeue requests for output component 330.

As will be discussed in more detail later, the credit count and the request count may be updated based on dequeuing packets from the input queues included in input component 310.

In some implementations, the data structure may indicate a credit count and/or a request count for nodes at different hierarchical levels within output component 330. For example, scheduler component 350 (e.g., a fabric scheduler) may have different levels of scheduling hierarchy and each level of scheduling hierarchy may have multiple nodes. A port level may represent output ports, a priority group level (below the port level) may represent priority groups, and an output queue level (below the priority group level) may represent output queues. Weights and/or credit counts may be assigned to each node at every hierarchical level, and the data structure may indicate a credit count and/or a request count for each node (e.g., a port, a priority group, and/or an output queue) at each level of scheduler hierarchy. While implementations described herein may focus on scheduling dequeues with respect to the credit count and/or request count for output component 330, it should be understood that some implementations may also schedule dequeues using credit counts and/ or request counts at different hierarchical levels within output component 330 (e.g., scheduling dequeues with respect to a credit count and/or a request count at a port level).

As further shown in FIG. 4A, process 400 may include receiving packets via input components 310 (block 404). For example, network device 210 may receive the packets from another network device 210 included in network 220 via input components 310, or from a device external to network 220.

In some implementations, input component 310 may receive packets via input ports associated with input component 310. For example, network device 210 may be capable of receiving packets via multiple input ports, and input component 310 may be configured to receive packets via a subset of input ports of the multiple input ports.

A packet (e.g., a data packet), received by network device 210, may be forwarded by network device 210 (e.g., via output component 330) to another network device 210 or another device. In some implementations, the packet may include information that identifies a source associated with the packet (e.g., a source media access control (MAC) address, a source IP address, etc.), a destination associated with the packet (e.g., a destination MAC address, a destination IP address, etc.), information that identifies a manner in which the packet is to be processed (e.g., a QoS level, a class associated with the packet, etc.) and/or other information associated with processing, forwarding, and/or providing the packet.

As further shown in FIG. 4A, process 400 may include adding the packets to input queues included in input components 310 and sending dequeue requests (block 406). For example, network device 210 (e.g., input component 310 included in network device 210) may add a packet to an input queue associated with an output queue that is to transmit the packet.

In some implementations, input component 310 may add the packet to an input queue based on information included in the packet. For example, the packet may include information that identifies a destination (e.g., a destination MAC address, a destination IP address, etc.) associated with the packet, and input component 310 may determine (e.g., based on information stored by input component 310) an output port via which the packet is to be provided. In this example, input component 310 may identify an output queue corresponding to the output port. Input component 310 may then add the packet to an input queue (e.g., a virtual output queue (VOQ)), associated with input component 310, which corresponds to the output queue. In some implementations, input component 310 may manage a set of input queues (e.g., a set of VOQs), where each input queue, of the set of input queues, corresponds to an output queue. In this way, each input component 310 included in network device 210 may manage an input queue that corresponds to a particular output queue. Furthermore, multiple input components 310 may each manage a separate input queue that corresponds to a single output queue associated with a particular output component 330.

Input component 310 may send a dequeue request to scheduler component 350 to schedule each packet to be sent from input component 310 to a particular output component 330. Scheduler component 350 may receive the dequeue request. In some implementations, scheduler component 350 may include a request table block that maintains a data structure indicating dequeue requests from all input components 310.

As further shown in FIG. 4A, process 400 may include determining whether a credit count for output component 330 satisfies a credit threshold and whether a request count for output component 330 satisfies a request threshold (block 408). For example, network device 210 (e.g., scheduler component 350 included in network device 210) may determine whether the credit count for output component 330 satisfies the credit threshold and whether the request count for output component 330 satisfies the request threshold based on the dequeue requests being received. In some implementations, network device 210 may determine whether the credit count satisfies the credit threshold and whether the request count satisfies the request threshold for each node at each hierarchal level (e.g., for each port, for each priority group, for each output queue, etc.).

Scheduler component 350 may store threshold information indicating the credit threshold and the request threshold. In some implementations, the credit threshold may be a particular value (e.g., 0, 1, 2, etc.). In some implementations, the request threshold may be a particular value (e.g., 0, 1, 2, etc.).

Scheduler component 350 may compare the credit count for each output component 330 (or node within each hierarchal level) to the credit threshold. In some implementations, if the credit count is less than the credit threshold, the credit count may not satisfy the credit threshold. On the other hand, if the credit count is greater than or equal to the credit threshold, the credit count may satisfy the credit threshold.

Similarly, scheduler component 350 may compare the request count for each output component 330 (or node within each hierarchal level) to the request threshold. In some implementations, if the request count is less than the request threshold, the request count may not satisfy the request threshold. On the other hand, if the request count is greater than or equal to the request threshold, the request count may satisfy the request threshold.

In some implementations, scheduler component 350 may wait until a dequeue response has been received for a most recent dequeue before determining whether the request count satisfies the request threshold. This may be because the dequeue response indicates whether more dequeue requests are pending for output component 330 as will be discussed in more detail later.

Block 408 may be repeated for each output component 330 to generate a rich list and/or a poor list of output components 330 (and/or a rich list and/or a poor list of nodes). The rich list may indicate output components 330 (e.g., rich input components) that have a credit count that satisfies the credit threshold and a request count that satisfies the request threshold. In some implementations, scheduler component 350 may only schedule dequeues to rich output components 330 (e.g., only grant input components 310 permission to send a packet to a rich output component 330). The poor list may indicate output components 330 (e.g., poor output components) that do not have a credit count that satisfies the credit threshold and/or a request count that satisfies the request threshold.

As further shown in FIG. 4A, if both the credit count for output component 330 satisfies the credit threshold and the request count for output component 330 satisfies the request threshold (block 408—yes), process 400 may include dequeuing a packet from an input queue included in input component 310 and sending the packet to output component 330 (block 410). For example, network device 210 may dequeue the packet based on the dequeue request from input component 310.

In some implementations, scheduler component 350 may grant input component 310 permission to transmit a packet to an output component 330. For example, the fabric scheduler block included in scheduler component 350 may schedule the packet to be dequeued from input component 310 and sent to output component 330 via switching component 320 (e.g., a switch fabric). At a time scheduler component 350 grants the permission, scheduler component 350 may not be aware of a size of the packet being dequeued from input component 310.

In some implementations, scheduler component 350 (e.g., the fabric scheduler) may grant permission for the dequeues according to priorities. Scheduler component 350 may support different priority levels at the different hierarchal levels. For example, scheduler component 350 may support a priority high (PH) level, a priority medium (PM) level, a priority low (PL) level, and/or a priority excess (PE) level. In some implementations, the number of priority levels available may be the same as the number of priority levels available to the port scheduler.

In some implementations, scheduler component 350 may perform a weighted round robin across all ports in the port level that satisfy the credit threshold and the request threshold. Once a port node in the port level is selected, scheduler component 350 may arbitrate across all priority group nodes for the selected port node at the priority group level. The arbitration may be done in a strict priority where PH, PM, PL, PE is the order of priority. This means scheduler component 350 arbitrates across all priority group nodes, which satisfy the credit threshold and the request threshold, with PH traffic and if there are no priority group nodes with PH traffic, then scheduler component 350 may arbitrate for PM traffic and so on. Once a priority group node is selected, scheduler component 350 may arbitrate across all the output queue nodes of the priority group node. In some implementations, the priority selected at the priority group level may be maintained for the output queue level arbitration.

Based on the grant, input component 310 may output the packet from the input queue (e.g., dequeue the packet) and send the packet to output component 330 via switching component 320. Output component 330 may receive the packet and may add the packet to an output queue included in output component 330. In this manner, scheduler component 350 (e.g., the fabric scheduler) may dequeue according to priorities and the bandwidth distribution according to priorities (e.g., a QoS property) may be maintained even if the fabric scheduler becomes dominant.

As further shown in FIG. 4A, process 400 may include updating the request count for output component 330 based on dequeuing the packet (block 412). For example, network device 210 (e.g., scheduler component 350 included in network device 210) may update the request count.

In some implementations, scheduler component 350 may decrement the request count by a value (e.g., a value of 1) to indicate a dequeue request has been processed for output component 330. In some implementations, network device 210 may update the request count for nodes at each hierarchal level of output component 330.

As further shown in FIG. 4A, process 400 may include obtaining a dequeue response indicating a size of the packet dequeued and indicating pending dequeue requests for output component 330 (block 414). For example, network device 210 (e.g., scheduler component 350) may obtain the dequeue response.

In some implementations, scheduler component 350 may obtain the dequeue response after the packet has been dequeued from input component 310 and/or sent to output component 330. In other words, there may be a particular latency between the dequeuing of the packet and obtaining the dequeue response. For example, scheduler component 350 may obtain the dequeue response after a particular quantity of cycles since dequeuing the packet. In some implementations, scheduler component 350 may give more grants to input components 310 to dequeue packets to output component 330 during this latency and before the dequeue response is obtained. In other words, process 400 may return to block 408 (for a same output component 330) to continue dequeuing packets to output component 330 before the dequeue response is obtained.

In some implementations, scheduler component 350 may obtain the dequeue response from input component 310, switching component 320, output component 330, and/or the request table block included in scheduler component 350 that maintains a data structure for dequeue requests for output component 330.

The dequeue response may indicate a size of the dequeued packet (e.g., a number of bits in the packet, a number of bytes in the packet, etc.) and whether output component 330 has more pending dequeue requests. In some implementations, the size of the dequeued packet may be different than the size of other dequeued packets. In some implementations, the dequeue response may indicate a quantity of pending dequeue requests for output component 330.

As shown in FIG. 4B, process 400 may include updating the credit count for output component 330 based on the size of the packet (block 416). For example, network device 210 (e.g., scheduler component 350 included in network device 210) may update the credit count by decrementing the credit count by the size of the packet indicated by the dequeue response. In other words, a value representing a quantity of data (e.g., bits, bytes, etc.) included in the packet may be subtracted from the credit count. In some implementations, network device 210 may update the credit count for nodes at each hierarchal level of output component 330.

As further shown in FIG. 4B, process 400 may include updating the request count for output component 330 based on the pending dequeue requests (block 418). For example, network device 210 (e.g., scheduler component 350) may update the request count by incrementing the request count based on the pending dequeue requests.

In some implementations, scheduler component 350 may increment the request count by a value (e.g., a value of 1) indicating more dequeue requests remain for output component 330. Additionally, or alternatively, scheduler component 350 may set the request count to a particular value indicating a quantity of dequeue requests remaining for input component 310.

On the other hand, scheduler component 350 may set the request count to a particular value (e.g., a value that fails to satisfy the request threshold) if no more dequeue requests remain for output component 330.

As further shown in FIG. 4B, process 400 may include modifying the packet to add or remove data (block 420). For example, network device 210 (e.g., output component 330 included in network device 210) may modify the packet.

In some implementations, output component 330 may perform an egress rewrite on the dequeued packet (e.g., to add, modify, or remove tags). For example, the port scheduler block included in scheduler component 350 may instruct output component 330 to add, modify, or remove a header according to QoS properties. For instance, type-of-service bits for the packet may be changed. In some implementations, the packet may be dropped due to egress policing. The port scheduler block may further schedule packets included in the output queues to be outputted to network 220 via output component 330 (e.g., output ports) based on QoS properties of the packets.

As further shown in FIG. 4B, process 400 may include obtaining modification information indicating a size of the modification to the packet (block 422). For example, network device 210 (e.g., scheduler component 350 included in network device 210) may obtain the modification information from the port scheduler block included in scheduler component 350 and/or from output component 330.

In some implementations, the modification information may indicate a change in the size of the packet due to the modification. For example, the modification information may indicate a positive quantity of data if the packet is larger after the modification. On the other hand, the modification information may indicate a negative quantity of data if the packet is smaller after the modification.

As further shown in FIG. 4B, process 400 may include updating the credit count based on the size of the modification (block 424). For example, network device 210 (e.g., scheduler component 350) may update the credit count. In some implementations, network device 210 may update the credit count for nodes at each hierarchal level of output component 330.

In some implementations, scheduler component 350 may update the credit count by decrementing the credit count by the size of the modification indicated by the modification information. For example, if the modification information indicates that a quantity of data was added to the packet due to the modification (e.g., the modification information indicates a positive quantity of data), the quantity of data may be decremented (e.g., subtracted) from the credit count to adjust for the larger modified packet.

On the other hand, scheduler component 350 may update the credit count by incrementing the credit count by the size of modification indicated by the modification information. For example, if the modification information indicates that a quantity of data was removed from the packet due to the modification (e.g., the modification information indicates a negative quantity of data), the quantity of data may be incremented (e.g., added) to the credit count to adjust for the smaller modified packet.

As further shown in FIG. 4B, process 400 may include outputting the packet via output component 330 (block 426). For example, network device 210 may output the packet, included in the output queue, via output component 330. For instance, network device 210 may send the packet to another network device 210 included in network 220.

In some implementations, blocks 410-426 may be repeated for each rich output component 330 (e.g., each output component 330 that has a credit count that satisfies the credit threshold and a request count that satisfies the request threshold).

As shown in FIG. 4C, if either of the credit count for output component 330 fails to satisfy the credit threshold or the request count for input component 310 fails to satisfy the request threshold (block 408—no), process 400 may include preventing dequeues of packets from being scheduled from input components 310 to output component 330 (block 428). For example, network device 210 (e.g., scheduler component 350 included in network device 210) may prevent dequeues of packets to output component 330 (e.g., a poor output component).

In some implementations, scheduler component 350 may prevent dequeues of packets by not scheduling dequeues to output component 330 and/or by not granting input components 310 access to output component 330.

Additionally, or alternatively, scheduler component 350 may update the rich list and the poor list of output component 330 based on the credit count for output component 330 failing to satisfy the credit threshold and/or the request count for output component 330 failing to satisfy the request threshold. For example, output component 330 may be moved from the rich list to the poor list.

As further shown in FIG. 4C, process 400 may include waiting until all output components 330 fail to satisfy at least one of the credit threshold or the request threshold (block 430). For example, network device 210 (e.g., scheduler component 350) may wait until all output components 330 fail to satisfy at least one of the credit threshold or the request threshold. In other words, network device 210 may wait until all output components 330 are poor output components and there are no more rich output components.

In some implementations, blocks 408-428 may be repeated for rich output components until there are no more rich output components. Accordingly, scheduler component 350 may prevent dequeues to poor output components during this wait time while scheduling dequeues to rich output components. Thus, some output components 330 (e.g., those with a higher initial credit count) may receive more dequeued data than other output components 330 (e.g., those with a lower initial credit count).

Accordingly, a bandwidth distribution according to weights (e.g., a QoS property) may be maintained if the fabric scheduling (e.g., scheduling packets to be sent from input components 310 to output components 330) becomes the dominant scheduling and the output scheduling (e.g., scheduling output of packets based on QoS properties of the packets) is not capable of properly maintaining the QoS properties due to lack of fabric speedup.

Once there are no more rich output components and all output components 330 have become poor output components (e.g., once no output components 330 may have a dequeue scheduled), process 400 may advance to block 432.

In some implementations, scheduler component 350 may wait until dequeue responses have been received for all dequeues before determining there are no more rich output components.

As further shown in FIG. 4C, process 400 may include replenishing credit counts for output components 330 (block 432). For example, network device 210 (e.g., scheduler component 350 included in network device 210) may replenish the credit count for each of output components 330. In some implementations, network device 210 may replenish the credit count for nodes at each hierarchal level of output component 330.

In some implementations, scheduler component 350 may replenish the credit counts by setting the credit count for each output component 330 back to the initial credit count for each output component 330. As previously discussed, the initial credit count may be set for each output component 330 based on a particular weight or ratio assigned to each output component 330.

In some implementations, scheduler component 350 may determine a minimum credit to be added to the credit counts for all the credit counts to satisfy the credit threshold. Scheduler component 350 may increase the credit counts based on the minimum credit and the weights or ratios assigned to input components 310. For example, assume a minimum credit is X, a first output component 330 has a weight of 4, and a second output component 330 has a weight of 1. Thus, the credit count for the first output component 330 may be increased by 4X and the credit count for the second output component 330 may be increased by X.

In some implementations, the replenished credit counts for output components 330 may not be the same as initial credit counts set for output components 330. Additionally, or alternatively, the replenished credit counts for output components 330 may be proportional to the initial credit counts for output components 330 (e.g., have a same ratio).

Process 400 may then return to block 408 in FIG. 4A to continue dequeuing packets to output component 330 based on the replenished credit counts.

One difference between a fabric scheduler and a port scheduler is that the port scheduler may have a rate update thread to maintain a rate QoS property and the fabric scheduler may not have the rate update thread. The rate update thread may program a bandwidth or rate for a port of an output component 330. For example, if a port is capable of communicating at a particular rate (e.g., 10 G), the rate update thread may be used to program the port to communicate at a different rate (e.g., 4 G).

In the case where the fabric scheduler is the dominant scheduler, scheduling dequeues as discussed with respect to process 400 may still maintain the rate QoS property even if there is no rate update thread included in scheduler component 350 (e.g., the fabric scheduler). Scheduler component 350, which is unaware of the programmed rate, may dequeue at a higher rate than the programmed rate (e.g. the rate the port is capable of communicating) based on the weight assigned to the port. The port scheduler, being aware of the programmed rate, may dequeue at the programmed rate (e.g., a lower rate than scheduler component 350 dequeues) causing a backlog of data in the output queues. Scheduler component 350 (e.g., the fabric scheduler) is then slowed down based on the backlog to the programmed rate. Accordingly, the rate QoS property may also be maintained by the scheduler component 350.

In this way, QoS properties (e.g., a bandwidth distribution according to weights, a bandwidth distribution according to priorities, and/or rate) may be maintained even if the fabric scheduler becomes a dominant scheduler.

Although FIGS. 4A-4C show example blocks of process 400, in some implementations, process 400 may include additional blocks, fewer blocks, different blocks, or differently arranged blocks than those depicted in FIGS. 4A-4C. Additionally, or alternatively, two or more of the blocks of process 400 may be performed in parallel.

FIG. 5 is a diagram of an example implementation 500 relating to example process 400 shown in FIGS. 4A-4C. FIG. 5 shows an example of dequeuing based on weights for output components to achieve QoS.

In FIG. 5, assume a credit threshold is equal to 0 and that the credit threshold is satisfied if a credit count is greater than or equal to 0. Consequently, assume the credit threshold is not satisfied if the credit count is less than 0. Further, assume a request threshold is equal to 0 and that the request threshold is satisfied if a request count is greater than 0. Likewise, assume the request threshold is not satisfied if the request count is less than or equal to 0.

Additionally, assume network device 210 includes a 400 G output component and a 100 G output component. Further, assume the 400 G output component is assigned a weight of 4 and the 100 G output component is assigned a weight of 1 based on the rates of the input components (e.g., 400 G Ethernet and 100 G Ethernet).

As shown at block 502 in FIG. 5, network device 210 may set a credit count and a request count for each of the 400 G output component and the 100 G output component. For example, network device 210 may set a credit count to be 96 for the 400 G output component and a credit count to be 0 for the 100 G output component based on default initial values, based on the weights, or based on a prior replenish of credits. The credit count may indicate a number of bytes. Assume the 400 G output component and the 100 G output component both have pending dequeue requests for the packets to be dequeued from input queues and sent to output buffers included in the 400 output component and the 100 G output component. Accordingly, network device 210 may set a request count to be 1 for each of the 400 G output component and the 100 G output component indicating there are pending dequeue requests for the 400 G output component and the 100 G output component.

As further shown at block 504 in FIG. 5, network device 210 may dequeue a packet for the 400 G output component based on the credit count for the 400 G output component (96) being greater than or equal to the credit threshold (0), and based on the request count for the 400 G output component (1) being greater than the request threshold (0). Network device 210 may decrement the request count for the 400 G output component by a value of 1, and update the request count for the 400 G output component to be 0 based on dequeuing the packet.

As further shown at block 506 in FIG. 5, network device 210 may dequeue a packet for the 100 G output component based on the credit count for the 100 G output component (0) being greater than or equal to the credit threshold (0), and based on the request count for the 100 G output component (1) being greater than the request threshold (0). Network device 210 may decrement the request count for the 100 G output component by a value of 1, and update the request count for the 400 G output component to be 0 based on dequeuing the packet.

As further shown at block 508 in FIG. 5, network device 210 may obtain a dequeue response for dequeuing the packet for the 400 G output component at block 504. Assume the dequeue response indicates the dequeued packet has a size of 32 bytes and that another dequeue request is pending for the 400 G output component. Accordingly, network device 210 may subtract a value of 32 from the credit count for the 400 G output component and update the credit count to be 64 (e.g., 96−32=64). Similarly, network device 210 may increment the request count for the 400 G output component to be 1 to indicate at least one dequeue request is pending for the 400 G output component.

As further shown at block 510 in FIG. 5, network device 210 may obtain a dequeue response for dequeuing the packet for the 100 G output component at block 506. Assume the dequeue response indicates the dequeued packet has a size of 32 bytes and that another dequeue request is pending for the 100 G output component. Accordingly, network device 210 may subtract a value of 32 from the credit count for the 100 G output component and updates the credit count to be −32 (e.g., 0-32=−32). Similarly, network device 210 may increment the request count for the 100 G output component to be 1 to indicate at least one dequeue request is pending for the 100 G output component.

Assume network device 210 determines that the credit count of −32 for the 100 G output component fails to satisfy the credit threshold (0). Accordingly, network device 210 may prevent further dequeues for the 100 G output component until a replenish of the credit count.

As further shown at block 512 in FIG. 5, network device 210 may dequeue a packet for the 400 G output component based on the credit count for the 400 G output component (64) being greater than or equal to the credit threshold (0), and based on the request count for the 400 G output component (1) being greater than the request threshold (0). Network device 210 may decrement the request count for the 400 G output component by a value of 1, and update the request count for the 400 G output component to be 0 based on dequeuing the packet.

Even though the 100 G output component may have a pending dequeue request (e.g., a request count of 1), network device 210 may prevent a dequeue for the 100 G output component based on the credit count for the 100 G output component (−32) being below the credit threshold (0).

As further shown at block 514 in FIG. 5, network device 210 may obtain a dequeue response for dequeuing the packet for the 400 G output component at block 512. Assume the dequeue response indicates the dequeued packet has a size of 32 bytes and that another dequeue request is pending for the 400 G output component. Accordingly, network device 210 may subtract a value of 32 from the credit count for the 400 G output component and update the credit count to be 32 (e.g., 64−32=32). Similarly, network device 210 may increment the request count for the 400 G output component to be 1 to indicate at least one dequeue request is pending for the 400 G output component.

As further shown at block 516 in FIG. 5, network device 210 may dequeue a packet for the 400 G output component based on the credit count for the 400 G output component (32) being greater than or equal to the credit threshold (0), and based on the request count for the 400 G output component (1) being greater than the request threshold (0). Network device 210 may decrement the request count for the 400 G output component by a value of 1, and update the request count for the 400 G output component to be 0 based on dequeuing the packet.

Even though the 100 G output component may have a pending dequeue request (e.g., a request count of 1), network device 210 may prevent a dequeue for the 100 G output component based on the credit count for the 100 G output component (−32) being below the credit threshold (0).

As further shown at block 518 in FIG. 5, network device 210 may obtain a dequeue response for dequeuing the packet for the 400 G output component at block 512. Assume the dequeue response indicates the dequeued packet has a size of 32 bytes and that another dequeue request is pending for the 400 G output component. Accordingly, network device 210 may subtract a value of 32 from the credit count for the 400 G output component and update the credit count to be 0 (e.g., 32−32=0). Similarly, network device 210 may increment the request count for the 400 G output component to be 1 to indicate at least one dequeue request is pending for the 400 G output component.

As further shown at block 520 in FIG. 5, network device 210 may dequeue a packet for the 400 G output component based on the credit count for the 400 G output component (0) being greater than or equal to the credit threshold (0), and based on the request count for the 400 G output component (1) being greater than the request threshold (0). Network device 210 may decrement the request count for the 400 G output component by a value of 1, and update the request count for the 400 G output component to be 0 based on dequeuing the packet.

Even though the 100 G output component may have a pending dequeue request (e.g., a request count of 1), network device 210 may prevent a dequeue for the 100 G output component based on the credit count for the 100 G output component (−32) being below the credit threshold (0).

As further shown at block 522 in FIG. 5, network device 210 may obtain a dequeue response for dequeuing the packet for the 400 G output component at block 512. Assume the dequeue response indicates the dequeued packet has a size of 32 bytes and that another dequeue request is pending for the 400 G output component. Accordingly, network device 210 may subtract a value of 32 from the credit count for the 400 G output component and update the credit count to be −32 (e.g., 0−32=−32). Similarly, network device 210 may increment the request count for the 400 G output component to be 1 to indicate at least one dequeue request is pending for the 400 G output component.

Assume network device 210 determines that the credit counts for the 400 G output component and the 100 G output component fail to satisfy the credit threshold.

As further shown at block 534 in FIG. 5, network device 210 may replenish the credit counts for the 400 G output component and the 100 G output components based on no output components satisfying the credit threshold and having a request pending. Network device 210 may determine that a minimum credit that must be added to the credit counts for each credit count to satisfy the credit threshold is 32. Network device 210 may multiply the minimum credit (32) by the weights assigned to the 400 G output components and the 100 G output components to determine an amount of credits to add to the credit counts. For example, the 400 G output component has a weight of 4, so 4*32=128 credits are added to the credit count for the 400 G output component (−32), such that the credit count is replenished to 96 (−32+128=96). Similarly, the 100 G output component has a weight of 1, so 1*32=32 credits are added to the credit count for the 100 G output component (−32), such that the credit count is replenished to 0 (−32+32=0).

Accordingly, after one round or dequeues (e.g., after one replenish of credit counts), there has been four times as much data dequeued for the 400 G output component than the 100 G output component, which is consistent with the weights assigned to the input components to achieve the QoS. In other words, the fabric scheduling has maintained the rates of the 100 G output component and the 400 G output component without fabric speedup.

As indicated above, FIG. 5 is provided merely as an example. Other examples are possible and may differ from what was described with regard to FIG. 5.

Some implementations described herein may achieve QoS without requiring fabric speedup. Additionally, or alternatively, fabric scheduling may be used to achieve QoS based on weights assigned to output components and sizes of packets dequeued for the output components.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
store a credit value for each of a plurality of output components;
receive packets from a network device via an input component;
cause the input component to queue the packets,
selectively dequeue a packet from the input component, to be sent to an output component, based on whether the credit value for the output component satisfies a credit threshold,
the packets including the packet, and
the plurality of output components including the output component;
send the packet to the output component based on a destination of the packet when the packet is dequeued from the input component;
determine a size of the packet after the packet is dequeued;
update the credit value for the output component based on the size of the packet; and
output the packet to another network device via the output component.

2. The device of claim 1, where the one or more processors are further to:
receive a dequeue response after the packet has been sent to the output component,
the dequeue response indicating the size of the packet; and
where the one or more processors, when determining the size of the packet, are further to:
determine the size of the packet based on the dequeue response.

3. The device of claim 1, where the one or more processors, when selectively dequeuing the packet, are further to:
dequeue the packet based on the credit value for the output component satisfying the credit threshold.

4. The device of claim 1, where the one or more processors, when selectively dequeuing the packet, are further to:
prevent scheduling a dequeue of the packet based on the credit value for the output component failing to satisfy the credit threshold.

5. The device of claim 1, where the one or more processors are further to:
modify the packet after dequeuing the packet;
determine a change in size of the packet due to the modification;
update the credit value for the output component based on the change in size of the packet due to the modification.

6. The device of claim 5, where the one or more processors, when modifying the packet, are further to:
drop, add, or change a header of the packet.

7. The device of claim 5, where the one or more processors, when updating the credit value based on the change in the size of the packet, are further to:
increase the credit value if the packet is smaller due to the modification; and
decrease the credit value if the packet is larger due to the modification.

8. A computer-readable medium storing instructions, the instructions comprising:
one or more instructions that, when executed by one or more processors, cause the one or more processors to:
store a credit value for each of a plurality of output components,
the credit value being based on weights assigned to the plurality of output components;
receive packets from a first device via an input component;
cause the input component to store the packets in one or more queues,
selectively dequeue a packet from the input component, to be sent to an output component, based on whether the credit value for the output component satisfies a credit threshold,
the packets including the packet,
the plurality of output components including the output component;
send the packet to the output component based on a destination of the packet when the packet is dequeued;
determine a size of the packet;
update the credit value for the output component based on the size of the packet; and
output the packet to a second device via the output component.

9. The computer-readable medium of claim 8, where the one or more instructions, when executed by the one or more processors, further cause the one or more processors to:
assign the weights to the plurality of output components based on data rates of the plurality of output components.

10. The computer-readable medium of claim 8, where the one or more instructions, when executed by the one or more processors, further cause the one or more processors to:
store a request value for each particular output component of the plurality of output components,
the request value indicating whether there any pending dequeue requests for the particular output component; and
where the one or more instructions, when selectively dequeuing the packet, further cause the one or more processors to:
selectively dequeue the packet from the input component based on whether the request value for the output component satisfies a request threshold and based on whether the credit value for the output component satisfies the credit threshold.

11. The computer-readable medium of claim 10, where the one or more instructions, when executed by the one or more processors, further cause the one or more processors to:
decrement the request value based on dequeuing the packet.

12. The computer-readable medium of claim 10, where the one or more instructions, when executed by the one or more processors, further cause the one or more processors to:
receive a dequeue response after the packet has been dequeued,
the dequeue response indicating whether an additional dequeue request is pending for the output component; and
update the request value based on the dequeue response.

13. The computer-readable medium of claim 10, where the one or more instructions, when executed by the one or more processors, further cause the one or more processors to:
determine that none of the plurality of output components has the credit value that satisfies the credit threshold and the request value that satisfies the request threshold; and
replenish the credit value for each of the plurality of output components based on determining that none of the plurality of output components has the credit value that satisfies the credit threshold and the request value that satisfies the request threshold.

14. The computer-readable medium of claim 8, where the one or more instructions, that cause the one or more processors to selectively dequeue the packet, further cause the one or more processors to:
prevent dequeuing of the packet while the credit value fails to satisfy the credit threshold.

15. A method, comprising:
storing, by a device, a credit value for each of a plurality of output components,
the credit value being based on weights assigned to the plurality of output components;
receiving, by the device, packets from a first device, via a plurality of input components, to be output to a second device;
causing, by the device, the plurality of input components to store the packets in one or more queues included in the plurality of input components,
selectively dequeuing, by the device, a packet from a particular input component, to be sent to an output component, based on whether the credit value for the output component satisfies a credit threshold,
the packets including the packet,
the plurality of output components including the output component;
sending, by the device, the packet to the output component to be output from the device when the packet is dequeued;
determining, by the device, a size of the packet after the packet has been dequeued;
updating, by the device, the credit value for the output component based on the size of the packet; and
outputting, by the device, the packet to the second device via the output component.

16. The method of claim 15, further comprising:
determining that none of the plurality of output components has the credit value that satisfies the credit threshold; and
updating the credit value for each of the plurality of output components based on determining that none of the plurality of output components has the credit value that satisfies the credit threshold and based on the weights assigned to the plurality of output components.

17. The method of claim 16, where updating the credit values for each of the plurality of output components further comprises:
determining a minimum credit value to add to each of the credit values for the credit values for the plurality of output components to satisfy the credit threshold; and
updating the credit value for each of the plurality of output components based on the minimum credit value and the weights assigned to the plurality of output components.

18. The method of claim 15, further comprising:
storing a request value for each of the plurality of output components,
the request value indicating whether there are any pending dequeue requests for each of the plurality of output components; and
where selectively dequeuing the packet from the particular input component includes selectively dequeuing the packet based on whether the request value for the output component satisfies a request threshold and whether the credit value for the output component satisfies the credit threshold.

19. The method of claim 18, further comprising:
determining that none of the plurality of output components has the credit value that satisfies the credit threshold and the request value that satisfies the request threshold; and
updating the credit value for each of the plurality of output components based on determining that none of the plurality of output components has the credit value that satisfies the credit threshold and the request value that satisfies the request threshold, and based on the weights assigned to the plurality of output components.

20. The method of claim 15, where selectively dequeuing the packet further comprises:
selectively dequeuing the packet based on a grant from a fabric scheduler and while maintaining a quality of service property,
the fabric scheduler being dominant to a port scheduler.

* * * * *